(12) United States Patent
Santhirahasan et al.

(10) Patent No.: US 7,990,112 B2
(45) Date of Patent: Aug. 2, 2011

(54) ADAPTIVE FIELD CONTROL OF A VARIABLE FREQUENCY SYNCHRONOUS GENERATOR

(75) Inventors: Venkatesan Santhirahasan, Mississauga (CA); Rob Paton, Caledon (CA)

(73) Assignee: Honeywell International Inc., Morristown, NJ (US)

( * ) Notice: Subject to any disclaimer, the term of this patent is extended or adjusted under 35 U.S.C. 154(b) by 399 days.

(21) Appl. No.: 12/191,487

(22) Filed: Aug. 14, 2008

(65) Prior Publication Data

US 2010/0039073 A1 Feb. 18, 2010

(51) Int. Cl.
*H02P 9/14* (2006.01)
(52) U.S. Cl. .......................... 322/28; 322/59
(58) Field of Classification Search .............. 322/24, 322/28, 25, 27, 37, 59, 99
See application file for complete search history.

(56) References Cited

U.S. PATENT DOCUMENTS

| | | | | |
|---|---|---|---|---|
| 4,723,105 A | * | 2/1988 | Matouka et al. | 320/123 |
| 4,829,228 A | * | 5/1989 | Buetemeister | 322/27 |
| 5,254,936 A | * | 10/1993 | Leaf et al. | 322/90 |
| 5,986,439 A | | 11/1999 | Pletta et al. | |
| 6,003,304 A | * | 12/1999 | Swanson et al. | 60/274 |
| 6,046,917 A | * | 4/2000 | Gibbs et al. | 363/69 |
| 6,208,120 B1 | * | 3/2001 | Gibbs | 322/59 |
| 6,232,751 B1 | * | 5/2001 | Farr et al. | 322/59 |
| 6,628,104 B2 | | 9/2003 | Yao et al. | |
| 6,704,214 B1 | * | 3/2004 | Gibbs et al. | 363/87 |
| 6,750,635 B2 | * | 6/2004 | Harmon | 322/29 |
| 7,106,030 B2 | * | 9/2006 | Isurin et al. | 322/59 |
| 7,345,456 B2 | * | 3/2008 | Gibbs et al. | 322/19 |
| 7,583,062 B2 | * | 9/2009 | Harmon et al. | 322/24 |
| 7,719,239 B2 | * | 5/2010 | Eldery et al. | 322/28 |
| 7,759,909 B2 | * | 7/2010 | Graovac et al. | 322/59 |
| 2003/0057925 A1 | * | 3/2003 | Harmon | 322/29 |

\* cited by examiner

*Primary Examiner* — Nicholas Ponomarenko
(74) *Attorney, Agent, or Firm* — Miriam Jackson, Esq.

(57) ABSTRACT

A voltage regulator with an adaptive field discharge control system may use the rate of change of the POR voltage, the rate of change of the output current and rate of change of the field current, or any combination of these, as an input. The adaptive field discharge control system may process the inputs, identify an operating condition, such as unbalanced load, overcurrent and overload, and compare reference setpoints against that condition. Conventional field control circuits may be triggered by a fixed POR voltage setpoint for all operating conditions. In addition, conventional field control circuits may trigger field discharge to turn on and off continuously during systems oscillations. To avoid these issues, the adaptive field control circuit of the present invention may include a variable POR voltage setpoint, based upon one or more of the rate of change in the POR voltage, the DC bus voltage, or the percentage of unbalanced load. This invention can be extended for any More Electric Vehicle applications.

20 Claims, 8 Drawing Sheets

US 7,990,112 B2

ADAPTIVE FIELD CONTROL OF A VARIABLE FREQUENCY SYNCHRONOUS GENERATOR

BACKGROUND OF THE INVENTION

The present invention generally relates to systems and methods for regulating voltage and, more particularly, to adaptive field control systems and methods for regulating the point-of-regulation voltage that controls power generation.

Electrical power for commercial and military application is typically generated by either an alternating current (AC) or a direct current (DC) generator that is controlled by regulating the voltage at a point-of-regulation (POR). A generator control unit (GCU) modulates the generator excitation current according to load and speed conditions to maintain a constant output voltage at the POR. The GCU must compensate for load transitions by increasing or decreasing the field current. If the load transition compensation is not achieved within a recovery time limit, the POR voltage could fall outside the customer power quality limits, thereby causing the utilization equipment malfunction and/or damage.

For aircraft with a traditional fixed frequency system that normally operates at 400 Hz, lack of adequate load transition compensation does pose a minor performance issue. However, this problem may pose a severe performance issue in the case of variable frequency systems, since the operating speed is wide ranging and varies, for example, from 10,000 rpm to 24,000 rpm.

Field discharge may be used to compensate the load transition conditions. A field discharge circuit may include a field switch and discharge resistance through which the energy is dissipated in short duration during load transitions. In conventional systems, the field discharge circuit is trigged based on the POR voltage, output current, or field current.

For example, when the POR voltage is greater than a certain limit, the field discharge circuit is engaged to dissipate the energy. Once the POR voltage drops to normal operating voltage, the field discharge circuit is disengaged.

There are disadvantages with conventional field discharge systems. The following are some of the problems and shortcomings of the presently known field discharge systems: a) the field discharge circuit is trigged based on a fixed POR voltage set point for all operating conditions; b) selecting a set point close to operating voltage condition will result in system oscillations during large motor load, non-motor load and unbalanced conditions; c) system oscillations can happen when the POR voltage varies outside of power quality specifications (less than the over voltage (OV) limit and greater than the under voltage (UV) limit), causing the field discharge to turn on and turn off continuously, which may result in overheating and damage of the field discharge resistance and other components in the voltage regulator; d) loss of field discharge function will result in system trip and controller damage under large load removal conditions; e) selecting the set point limit higher than or near to over voltage limit will not protect the system against the load transients; and f) damage in the voltage regulator will result in loss of electric power and impact the generator control unit reliability.

As can be seen, there is a need for reliable field discharge systems and methods that results in better field control throughout the entire speed and various operating conditions of variable frequency generator applications as compared to conventional systems and methods.

SUMMARY OF THE INVENTION

In one aspect of the present invention, a method for regulating a voltage output of a generator at a point of regulation comprises measuring a sensed voltage at the point of regulation; calculating an adaptive setpoint voltage by using at least one of the a current at the point of regulation ($I_{POR}$), the rate of change of the voltage at the point of regulation ($V_{POR}$), the rate of change of a DC bus voltage and the rate of change of a field current ($I_{FIELD}$); shutting down a voltage regulator and engaging a field discharge circuit when the sensed voltage at the point of regulation is greater than the adaptive setpoint voltage; and disengaging a field discharge circuit when the sensed voltage is less than or equal to the adaptive setpoint voltage.

In another aspect of the present invention, a method for adaptive field control of a variable frequency generator output comprises measuring a sensed voltage at the point of regulation; calculating a first adaptive setpoint voltage by measuring a sensed current at the point of regulation ($I_{POR}$) and comparing the sensed current to a predetermined value; calculating a second adaptive setpoint voltage by measuring the rate of change of the voltage at the point of regulation ($V_{POR}$) and comparing the rate of change of the voltage at the point of regulation to a predetermined voltage rate of change value; calculating a third adaptive setpoint voltage by measuring the rate of change of a DC bus voltage and the rate of change of a field current ($I_{FIELD}$) and comparing the rate of change of the DC bus voltage to a predetermined DC bus voltage rate of change value; shutting down a voltage regulator and engaging a field discharge circuit when the sensed voltage at the point of regulation is greater than one of the first, second or third adaptive setpoint voltage; and disengaging a field discharge circuit when the sensed voltage is less than or equal to each of the first, second or third adaptive setpoint voltage.

In a further aspect of the present invention, a variable frequency voltage generation system comprises a generator to convert mechanical energy to electrical energy; a generator control unit to modulate a generator excitation current according to load and speed conditions to maintain a constant output voltage from the generator at a point of regulation; and an adaptive field control to compensate for load transition conditions These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides a voltage regulator with an adaptive field discharge control system and methods for regulating a voltage output of a generator at a point of regulation. The adaptive field discharge control system may use the rate of change of the POR voltage, the rate of change of the output current, and rate of change of the field current, or any combination of these, as an input. The adaptive field discharge control system may process the inputs, identify the operating condition—such as unbalanced load, overcurrent and overload—and compare reference setpoints against that condition.

Prior art field control circuits may be triggered by a fixed POR voltage setpoint for all operating conditions. In addition, prior art field control circuits may trigger field discharge to turn on and off continuously during systems oscillations. The adaptive field control circuit and methods for regulating a voltage output of a generator at a point of regulation, according to the present invention, may include a variable POR voltage setpoint, based upon one or more of the rate of change in the POR voltage, the DC bus voltage, or the percentage of unbalanced load. The use of these POR setpoint calculations will be described in greater detail below.

The adaptive field discharge control system and method of the present invention may be useful in variable frequency electrical power generation. Typically, commercial and military vehicles, such as aircraft, may benefit from the adaptive field discharge control system and method of the present invention.

Figure 1:
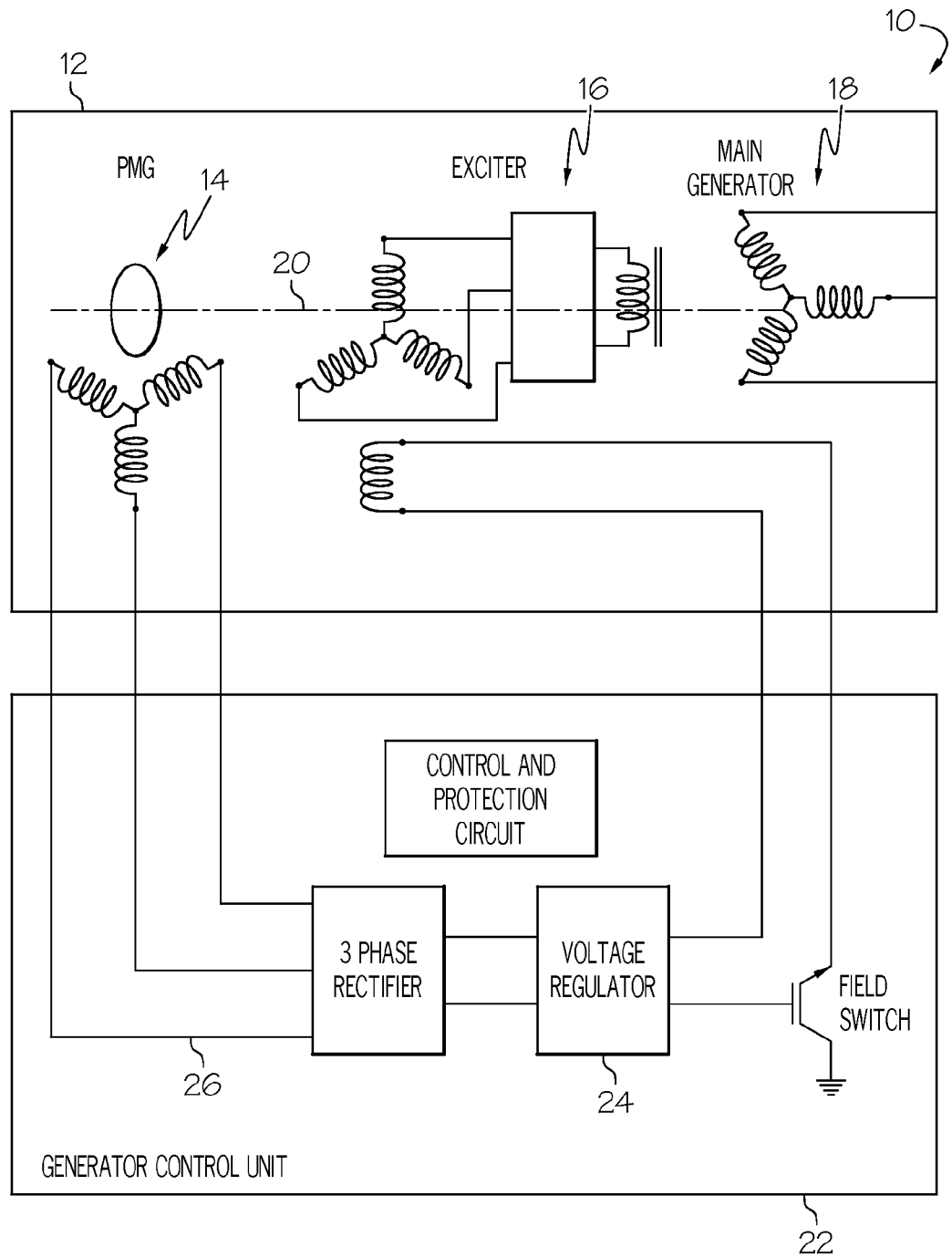
FIG. 1 is a schematic diagram describing a generator and generator control unit adaptable for use with the present invention.

Referring to FIG. 1, there is shown an exemplary variable frequency (VF) system 10 that may include a brushless synchronous generator 12 having a permanent magnetic generator (PMG) 14, an exciter 16, and a main generator 18 that are each connected to a rotating shaft 20. The PMG 14 may be used to convert mechanical energy to electrical energy. A generator control unit (GCU) 22 may include a voltage regulator 24 to modulate generator excitation current according to load and speed conditions in order to maintain a constant output voltage at the POR 26. The voltage regulator 24 may generally include an adaptive field control 28 with a field discharge circuit 30 (see FIG. 2) to compensate the load transition conditions.

Figure 2:
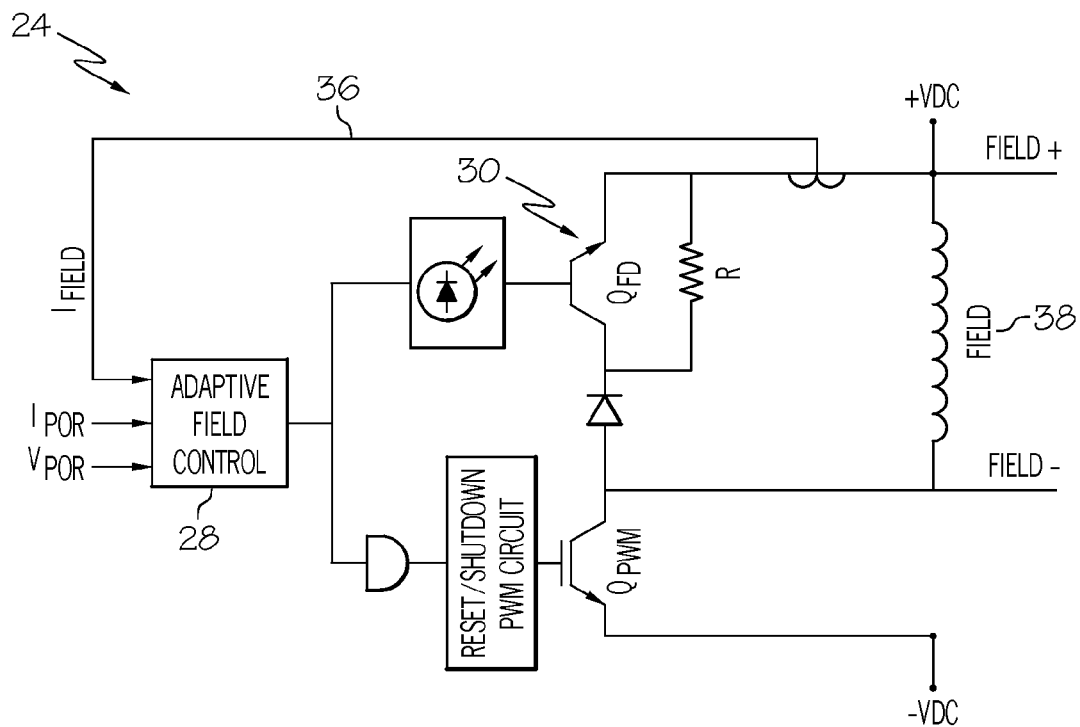
FIG. 2 is a schematic diagram describing a voltage regulator of FIG. 1, with adaptive field control according to the present invention.
Figure 3:
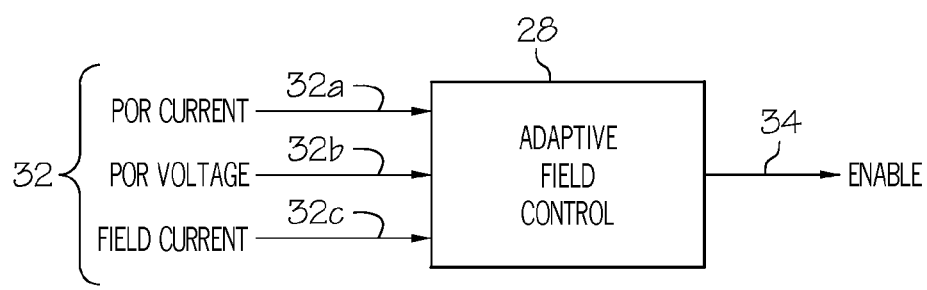
FIG. 3 is a schematic diagram describing the inputs and outputs of the adaptive field control of FIG. 2, according to the present invention.

Referring now to FIG. 2, there is shown a schematic diagram describing the voltage regulator 24 with adaptive field control 28, according to the present invention. Referring also to FIG. 3, there is shown a schematic diagram describing inputs 32 and outputs 34 of the adaptive field control 28, according to the present invention. The inputs 32 to the adaptive field control may include the current 32a at the POR 26 ($I_{POR}$), the voltage 32b at the POR ($V_{POR}$) 26 and the field current 32c ($I_{FIELD}$ 36) of the adaptive field control 28.

The adaptive field control 28 may process the inputs 32 and identify the operating condition of the system 10. The operating condition may be identified as, for example, an unbalanced load, an overcurrent condition, or an overload condition. The adaptive field control 28, as discussed in greater detail below, may compare a reference voltage setpoint (X), for example, against the above described operating conditions and provide the appropriate output.

For example, in an overcurrent condition, the adaptive field control 28 may provide outputs that will shutdown the field 38 and engage the field discharge circuit 30. Such an overcurrent condition may occur, for example, when a large (75-120 kilovolt-amps (kVA)) load is removed.

The following FIGS. 4 through 8 describe a control algorithm that may use rate of change of POR voltage ($V_{POR}$), rate of change in output current ($I_{POR}$), or rate of change in field current ($I_{FIELD}$), or any combination thereof, to identify load transients and over voltage conditions to shutdown the voltage regulator 24 and engage the field discharge circuit 30. The control algorithm may also identify the current operating condition, such as unbalance and overcurrent conditions, and may prevent the false triggering of the voltage regulator 24 under other operating conditions.

Figure 4:
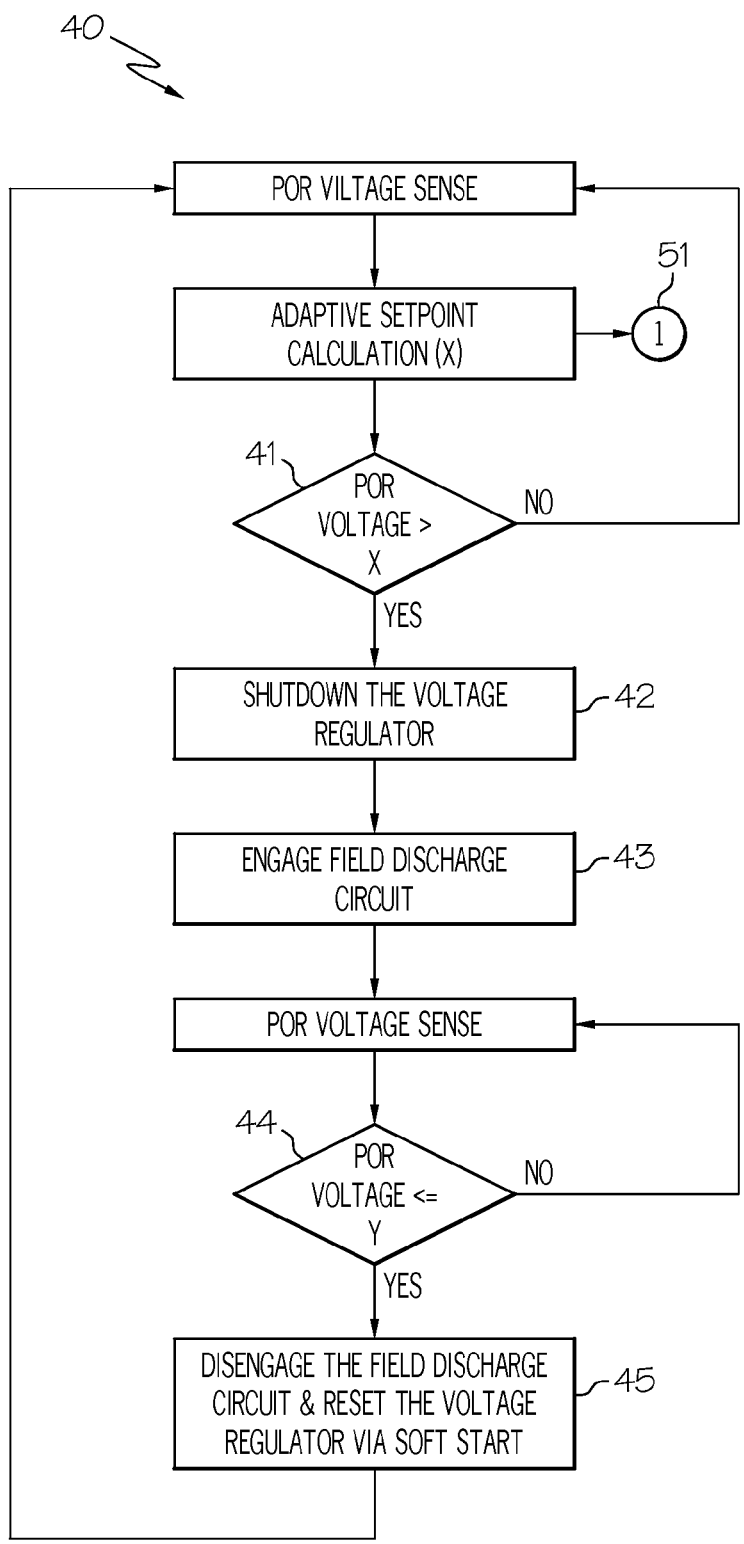
FIG. 4 is a flow chart describing a method for adaptive field control of a voltage regulator according to the present invention.

Referring specifically to FIG. 4, there is shown a flow chart describing a method 40 for adaptive field current control of a voltage regulator (e.g., voltage regulator 24) according to the present invention. In this flow chart 40, X is the voltage setpoint for engaging the voltage regulator shutdown and engaging the field discharge circuit (e.g., field discharge circuit 30), and Y is the rated voltage in Vrms. When the POR voltage is greater the voltage set point (X), as compared at step 41, the voltage regulator may be shutdown (step 42) and the field discharge circuit may be engaged (step 43) to dissipate the energy quickly, for example, in less than about 2 milliseconds. The voltage set point (X) may be determined from any of the FIG. 5, 6 or 7, as described below. When the POR voltage drops to a value equal or below the rated voltage (step 44), the field discharge function may be disengaged and voltage regulator may be reset through the soft start (step 45). This field discharge function may be used to limit the transient over voltage conditions.

Figure 5:
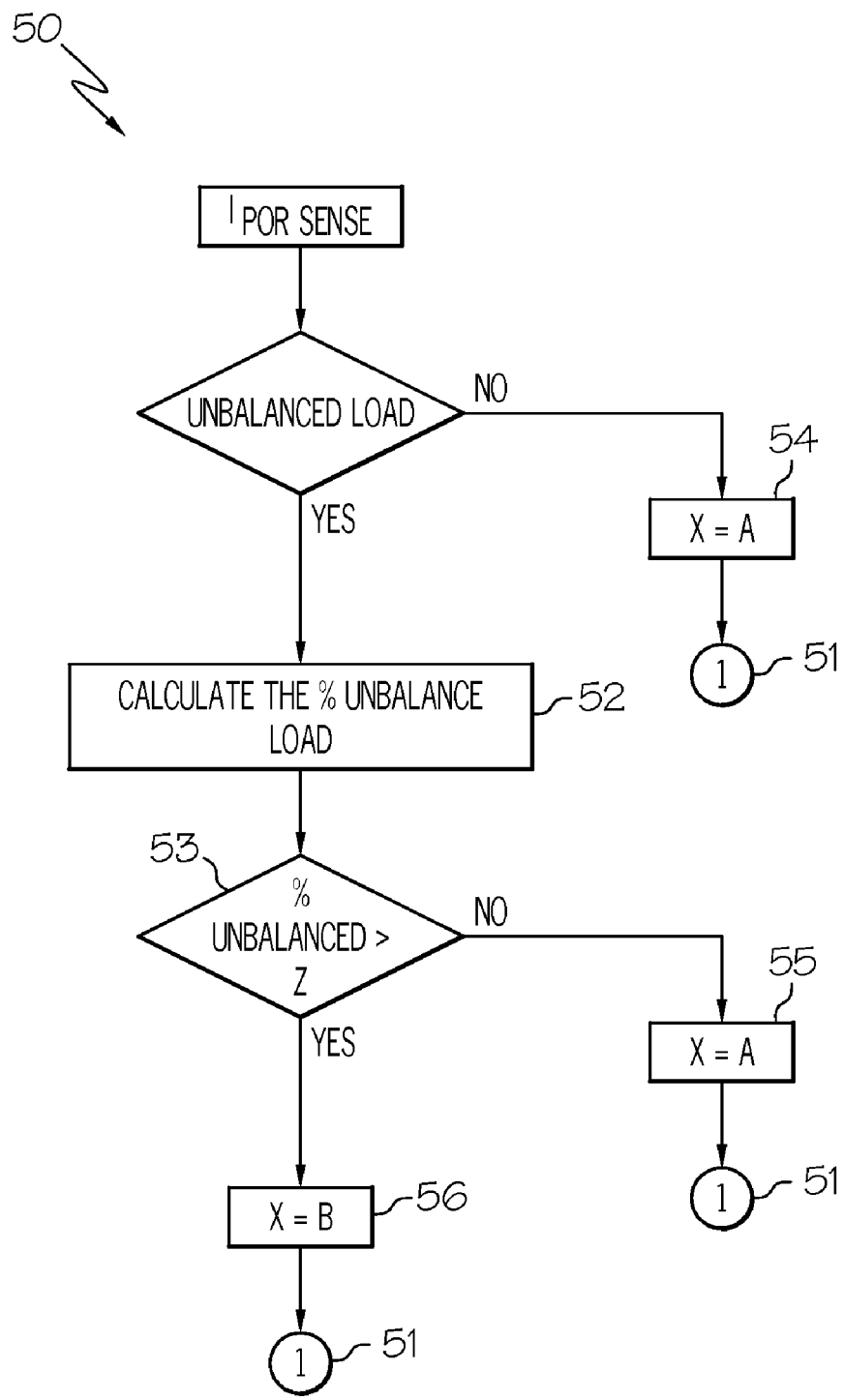
FIG. 5 is a flow chart describing a method for an adaptive setpoint calculation for unbalanced load conditions, according to the present invention.

Referring specifically to FIG. 5, there is shown a flow chart describing a method 50 for the adaptive setpoint 51 calculation for unbalanced load conditions, according to the present invention. With the adaptive setpoint 51 (X) calculation for unbalanced load conditions of FIG. 5, when the % unbalanced load (calculated in step 52) is greater than specified limit (step 53), the adaptive setpoint 51 (X) may be increased (step 55) to prevent system oscillations. In other words, two different voltage setpoints, A and B, may be used for balanced and unbalanced load conditions, wherein A is the adaptive setpoint 51 for balanced loads (chosen in step 54) or for loads where the % unbalanced is less than the specified limit (chosen in step 55), and B is the adaptive setpoint 51 for when the % unbalanced load is greater than a specified limit (chosen in step 56). This algorithm can be further improved by having multiple adaptive setpoints based on the % unbalanced load. For example, a first adaptive setpoint may be chosen when the % unbalanced load is between, for example, 10 and 20 percent; a second adaptive setpoint may be chosen when the % unbalanced load is between for example 20 and 30 percent, and the like.

Figure 6:
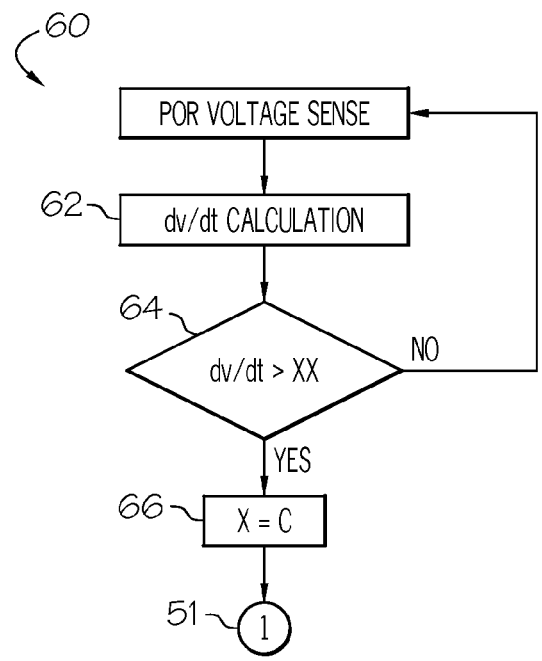
FIG. 6 is a flow chart describing a method for an adaptive setpoint calculation based on a rate of change in the POR voltage, according to the present invention.

Referring now to FIG. 6, there is shown a flow chart describing a method 60 for the adaptive setpoint 51 calculation based on a rate of change in the POR voltage, according to the present invention. Under larger load removal applications (such as loads from about 75-150 kVA), when the rates of change in the POR voltage (calculated at step 62) exceed the specified limit (step 64, XX), the field current to the generator may be controlled and the adaptive setpoint 51 may be set to a value, C (step 66).

Figure 7:
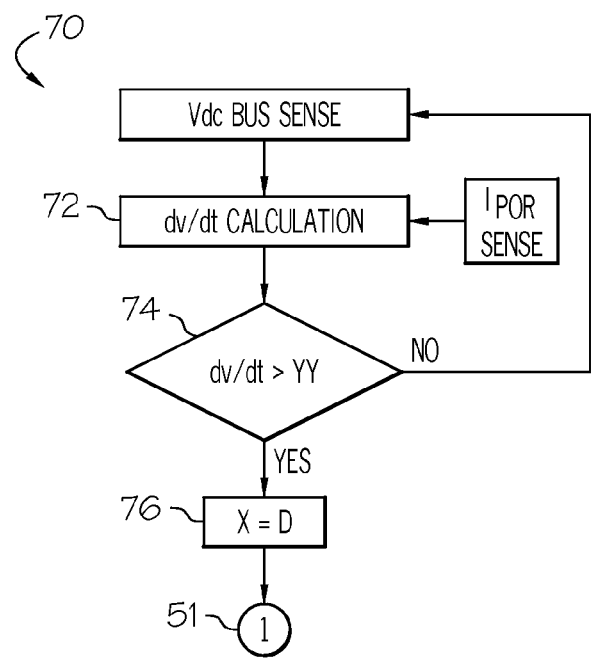
FIG. 7 is a flow chart describing a method for an adaptive setpoint calculation based on a rate of change in the DC voltage (Vdc), according to the present invention.

FIG. 7 shows a flow chart describing a method 70 for the adaptive setpoint 61 calculation based on rate of change in the DC bus voltage (Vdc). Under larger load removal applications, when the rate of change in the DC bus voltage (calculated in step 72) exceeds the specified limit (step 74, YY), the field current to the generator may controlled and the adaptive setpoint 51 may be set to a value, D (step 76).

According to one aspect of the present invention, the combination of all three conditions ($V_{POR}$ limit, Dv/Dt and DC bus) can be used for calculating the voltage setpoint 51 (X).

Also, when there is short circuit in the field circuit 30 (see FIG. 2), in the existing scheme, an over voltage (1/T function) or a field current level detector (not shown) may be used for protecting the generator. It is desirable to protect the variable frequency (VF) generator quickly, for example, in less than about 2 milliseconds, to avoid generator damage or failure.

Figure 8:
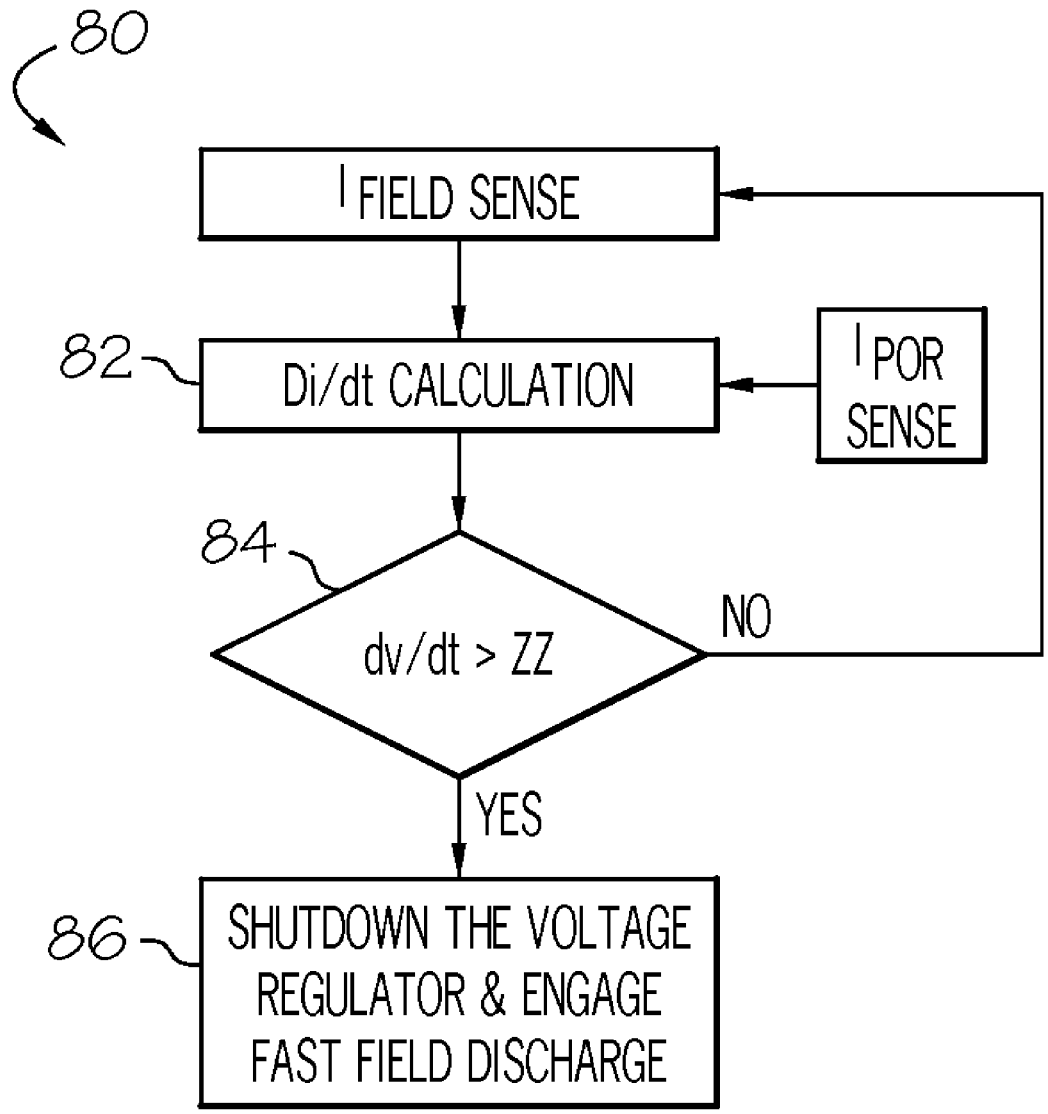
FIG. 8 is a flow chart describing a method for the field current calculation, according to the present invention.

Referring now to FIG. 8, there is shown a flow chart describing a method 80 for the $I_{FIELD}$ calculation, according to the present invention. The rate of change in the field current ($I_{FIELD}$) may be higher under a short circuit condition than the rate of change during normal operation. The rate of change in the field current (calculated in step 82) can be used for shutdown of the input generator power (disconnecting the PMG voltage) in short time (less than 2 ms). Load current ($I_{POR}$) may be used as masking signal to detect the condition. When the rate of change in the current at the POR (calculated in step 82) exceeds the specified limit (step 84, ZZ), the field current to the generator may controlled and shutdown of the input generator power (step 86) may occur.

The adaptive setpoint control of the present invention may adjust the POR adaptive setpoint 51 based on the operating conditions. During unbalanced load, however, the POR voltage at some phases is higher than the POR voltages at other phases. In general, aircraft generators should support unbalanced load conditions and the POR voltage should be within the power quality specification. During unbalanced load conditions, the POR voltages are different for each phase as result of the current imbalance and system response of the controller. Based on the level of unbalanced load, the voltage at one/two phases will be higher than the voltage at the other phase, which may trigger the field discharge circuit. If the field discharge circuit is triggered, system oscillations (as shown below, in reference to FIG. 9a) can happen which may damage the voltage regulator. The adaptive field control apparatus and methods, as described above, may process the inputs and identify the unbalanced conditions, thereby not triggering the field discharge and soft start.

EXAMPLES

Figure 9A:
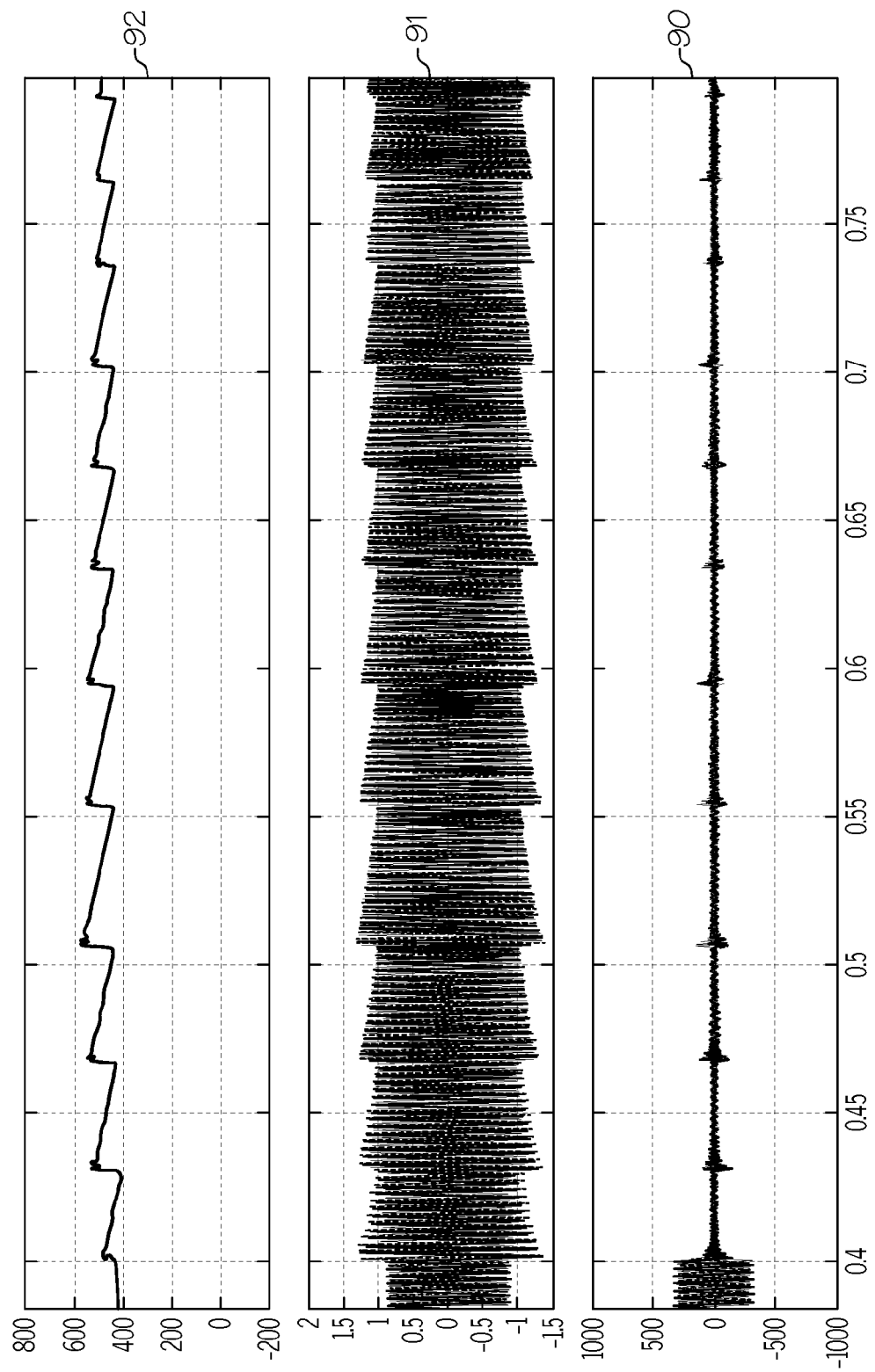
FIG. 9a shows simulation test results of a comparative example, without adaptive field control according to conventional field control methods.
Figure 9B:
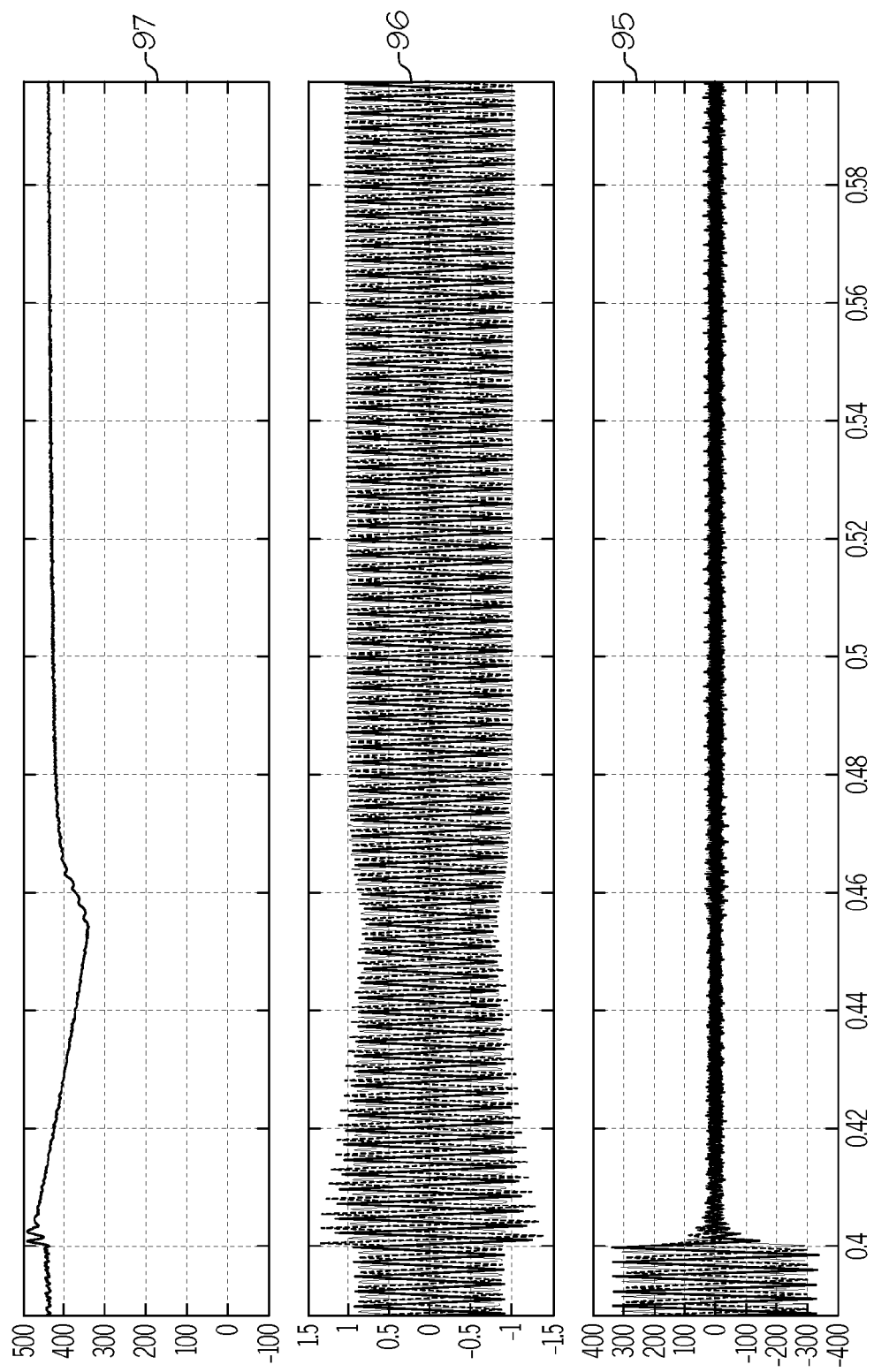
FIG. 9b shows simulation test results of a system with adaptive field control, according to the present invention.

Referring to FIGS. 9a and 9b, there are shown simulation test results without adaptive field control (FIG. 9a) and simulation test results with adaptive field control (FIG. 9b) during unbalanced load conditions.

The lower traces 90, 95 of FIGS. 9a and 9b, respectively, show the load current on the generator. The middle traces 91, 96 of FIGS. 9a and 9b, respectively show the voltage as measured at the POR. The top traces 92, 97 of FIGS. 9a and 9b, respectively, show the voltage as measured at the DC bus (Vdc). As can be seen from a comparison of FIGS. 9a and 9b, oscillations in the voltage at the POR may be avoided by using the adaptive field control system of the present invention.

Table 1, below, shows system test data using the adaptive field control of the present invention. The table shows the initial speed and load on the generator and the maximum voltage at the POR when the load is removed. The final column shows an example of a specific limit that may be imposed for the maximum voltage at the POR. This limit may be determined by equipment limitations, industry standards, governmental standards or the like. As can be seen, the adaptive field control system of the present invention meets or exceeds the maximum voltage limits of Table 1.

TABLE 1

| Speed (Krpm) | Load (KVA) | Max Voltage (v) at POR | Spec Limit |
| --- | --- | --- | --- |
| 18 | 75 | 140 | <150 |
| 18 | 75 | 134 | <150 |
| 18 | 90 | 141 | <170 |
| 13 | 75 | 128 | <150 |
| 13 | 75 | 126 | <150 |
| 24 | 75 | 141 | <150 |
| 24 | 75 | 134 | <150 |
| 24 | 90 | 149 | <170 |
| 24 | 120 | 158 (2) | <170 |
| 24 | 120 | 148 (2) | <170 |

It should be understood, of course, that the foregoing relates to exemplary embodiments of the invention and that modifications may be made without departing from the spirit and scope of the invention as set forth in the following claims.

We claim:

1. A method for regulating a voltage output of a generator at a point of regulation, the method comprising:
    measuring a sensed voltage at the point of regulation;
    calculating an adaptive setpoint voltage by using at least one of a sensed current at the point of regulation ($I_{POR}$), a rate of change of the sensed voltage at the point of regulation ($V_{POR}$), a rate of change of a DC bus voltage, and a rate of change of a field current ($I_{FIELD}$);
    shutting down a voltage regulator and engaging a field discharge circuit when the sensed voltage at the point of regulation is greater than the adaptive setpoint voltage; and
    disengaging a field discharge circuit when the sensed voltage is less than or equal to the adaptive setpoint voltage.

2. The method of claim 1, further comprising, after the disengaging step, resetting the voltage regulator via a soft start.

3. The method of claim 1, further comprising:
    measuring a sensed field current;
    calculating a rate of change of the sensed field current;
    shutting down a voltage regulator and engaging a fast field discharge to decay the voltage output of the generator at fast rate.

4. The method of claim 1, further comprising:
    calculating a percentage of unbalanced load based upon measuring the sensed current at the point of regulation;
    setting the adaptive setpoint voltage to a first value when the percentage of unbalanced load is less than or equal to a first predetermined limit; and setting the adaptive setpoint voltage to a second value when the percentage of unbalanced load is greater than the first predetermined limit.

5. The method of claim 4, further comprising setting the adaptive setpoint voltage to a third value when the percentage of unbalanced load is greater than a second predetermined limit, wherein the second predetermined limit is greater than the first predetermined limit.

6. The method of claim 1, further comprising:
calculating the rate of change of the sensed voltage at the point of regulation;
comparing the rate of change of the sensed voltage to a predetermined value;
setting the adaptive setpoint voltage to a first value when the rate of change of the sensed voltage is less than or equal to the predetermined value; and
setting the adaptive setpoint voltage to a second value when the rate of change of the sensed voltage is greater than the predetermined value.

7. The method of claim 1, further comprising:
calculating the rate of change of the DC bus voltage;
comparing the rate of change of the DC bus voltage to a predetermined value;
setting the adaptive setpoint voltage to a first value when the rate of change of the DC bus voltage is less than or equal to the predetermined value; and
setting the adaptive setpoint voltage to a second value when the rate of change of the DC bus voltage is greater than the predetermined value.

8. The method of claim 1, further comprising
measuring a rate of change in load current at the point of regulation to detect a short circuit condition; and
shutting down the generator when the short circuit condition is detected.

9. The method of claim 1, wherein the adaptive setpoint voltage is variable, thereby preventing false triggering of the step of shutting down a voltage regulator and engaging a field discharge circuit.

10. The method of claim 1, wherein the method provides a stable voltage output from the generator at the point of regulation.

11. A method for regulating a voltage output of a generator at a point of regulation, the method comprising:
measuring a sensed voltage at the point of regulation;
calculating an adaptive setpoint voltage by using at least one of a sensed current at the point of regulation ($I_{POR}$), a rate of change of the sensed voltage at the point of regulation ($V_{POR}$), a rate of change of a DC bus voltage, and a rate of change of a field current ($I_{FIELD}$);
shutting down a voltage regulator and engaging a field discharge circuit when the sensed voltage at the point of regulation is greater than the adaptive setpoint voltage;
disengaging a field discharge circuit when the sensed voltage is less than or equal to the adaptive setpoint voltage;
calculating a percentage of unbalanced load based upon measuring the sensed current at the point of regulation;
setting the adaptive setpoint voltage to a first value when the percentage of unbalanced load is less than or equal to a first predetermined limit; and
setting the adaptive setpoint voltage to a second value when the percentage of unbalanced load is greater than the first predetermined limit.

12. The method of claim 11, including setting the adaptive setpoint voltage to a third value when the percentage of unbalanced load is greater than a second predetermined limit, wherein the second predetermined limit is greater than the first predetermined limit.

13. The method of claim 11, including resetting the voltage regulator via a soft start after the disengaging step.

14. The method of claim 11, including:
measuring a sensed field current;
calculating a rate of change of the sensed field current;
shutting down a voltage regulator and engaging a fast field discharge to decay the voltage output of the generator at fast rate.

15. The method of claim 11, including:
calculating the rate of change of the DC bus voltage;
comparing the rate of change of the DC bus voltage to a predetermined value;
setting the adaptive setpoint voltage to a first value when the rate of change of the DC bus voltage is less than or equal to the predetermined value; and
setting the adaptive setpoint voltage to a second value when the rate of change of the DC bus voltage is greater than the predetermined value.

16. A method for regulating a voltage output of a generator at a point of regulation, the method comprising:
measuring a sensed voltage at the point of regulation;
calculating an adaptive setpoint voltage by using at least one of a sensed current at the point of regulation ($I_{POR}$), a rate of change of the sensed voltage at the point of regulation ($V_{POR}$), a rate of change of a DC bus voltage, and a rate of change of a field current ($I_{FIELD}$);
shutting down a voltage regulator and engaging a field discharge circuit when the sensed voltage at the point of regulation is greater than the adaptive setpoint voltage;
disengaging a field discharge circuit when the sensed voltage is less than or equal to the adaptive setpoint voltage;
calculating the rate of change of the sensed voltage at the point of regulation;
comparing the rate of change of the sensed voltage to a predetermined value;
setting the adaptive setpoint voltage to a first value when the rate of change of the sensed voltage is less than or equal to the predetermined value; and
setting the adaptive setpoint voltage to a second value when the rate of change of the sensed voltage is greater than the predetermined value.

17. The method of claim 16, including:
calculating the rate of change of the DC bus voltage;
comparing the rate of change of the DC bus voltage to a predetermined value;
setting the adaptive setpoint voltage to a first value when the rate of change of the DC bus voltage is less than or equal to the predetermined value; and
setting the adaptive setpoint voltage to a second value when the rate of change of the DC bus voltage is greater than the predetermined value.

18. The method of claim 16, including
measuring a rate of change in load current at the point of regulation to detect a short circuit condition; and
shutting down the generator when the short circuit condition is detected.

19. The method of claim 16, including, after the disengaging step, resetting the voltage regulator via a soft start.

20. The method of claim 16, including:
measuring a sensed field current;
calculating a rate of change of the sensed field current;
shutting down a voltage regulator and engaging a fast field discharge to decay the voltage output of the generator at fast rate.

* * * * *